(12) United States Patent
Kirshenboim et al.

(10) Patent No.: US 7,099,302 B2
(45) Date of Patent: Aug. 29, 2006

(54) DATA TRANSMISSION NETWORK

(75) Inventors: Gilad Kirshenboim, Netanya (IL); Shimon Peleg, Hod-Hasharon (IL)

(73) Assignee: Infineon Technologies AG, Munich (DE)

( * ) Notice: Subject to any disclaimer, the term of this patent is extended or adjusted under 35 U.S.C. 154(b) by 905 days.

(21) Appl. No.: 09/869,249

(22) PCT Filed: Apr. 25, 2001

(86) PCT No.: PCT/EP01/04687

§ 371 (c)(1),
(2), (4) Date: May 20, 2002

(87) PCT Pub. No.: WO02/089459

PCT Pub. Date: Nov. 7, 2002

(65) Prior Publication Data

US 2002/0159467 A1  Oct. 31, 2002

(51) Int. Cl.
*H04L 12/66* (2006.01)

(52) U.S. Cl. ...................... 370/352; 370/420

(58) Field of Classification Search .............. 370/352, 370/353, 354, 355, 356, 230, 401, 419, 420, 370/493, 469, 410, 465, 468, 480; 375/222, 375/229, 232, 233, 234

See application file for complete search history.

(56) References Cited

U.S. PATENT DOCUMENTS

| 6,130,893 | A | 10/2000 | Whittaker et al. | |
|---|---|---|---|---|
| 6,160,843 | A | 12/2000 | McHale et al. | |
| 6,181,777 | B1 | 1/2001 | Kiko | |
| 6,445,733 | B1 * | 9/2002 | Zuranski et al. | 375/231 |
| 6,639,913 | B1 * | 10/2003 | Frankel et al. | 370/356 |
| 6,781,981 | B1 * | 8/2004 | Kimbrough | 370/352 |
| 2002/0131436 | A1 * | 9/2002 | Suri | 370/419 |

FOREIGN PATENT DOCUMENTS

| DE | 198 07 723 A1 | 9/1999 |
|---|---|---|
| EP | 0 891 067 A2 | 1/1999 |
| JP | 11-122279 | 4/1999 |
| JP | 2000-295285 | 10/2000 |

OTHER PUBLICATIONS

Goralski, "ADSL and DSL Technologies", *ADSL and DSL Technologies*, New York:McGraw-Hill, 174-268 (1998).

* cited by examiner

*Primary Examiner*—Ajit Patel
(74) *Attorney, Agent, or Firm*—Fish & Richardson P.C.

(57) ABSTRACT

Data transmission network having a least one line termination device connected via a data transmission medium to several network termination devices, each network termination device comprising a request message generator for generating a data transmission request message when a data communication device connected to the network termination device is sending data, and an xDSL transceiver for transmitting an upstream data frame including the generated request message via the data transmission medium to the line termination device. The line termination device includes a selection unit for selecting network termination devices which have sent a request message depending on stored status information data of the network termination devices, a grant message generator for generating data transmission grant messages for the selected network termination devices, and an xDSL transceiver for broadcasting downstream data frames including the generated grant messages via the data transmission medium to the network termination devices.

19 Claims, 9 Drawing Sheets

State of the art

FIG 5

NT-status-table

| NT | NT-adress | number of required time slots |
|---|---|---|
| $NT_1$ | | |
| $NT_2$ | | |
| ⋮ | | |
| $NT_N$ | | |

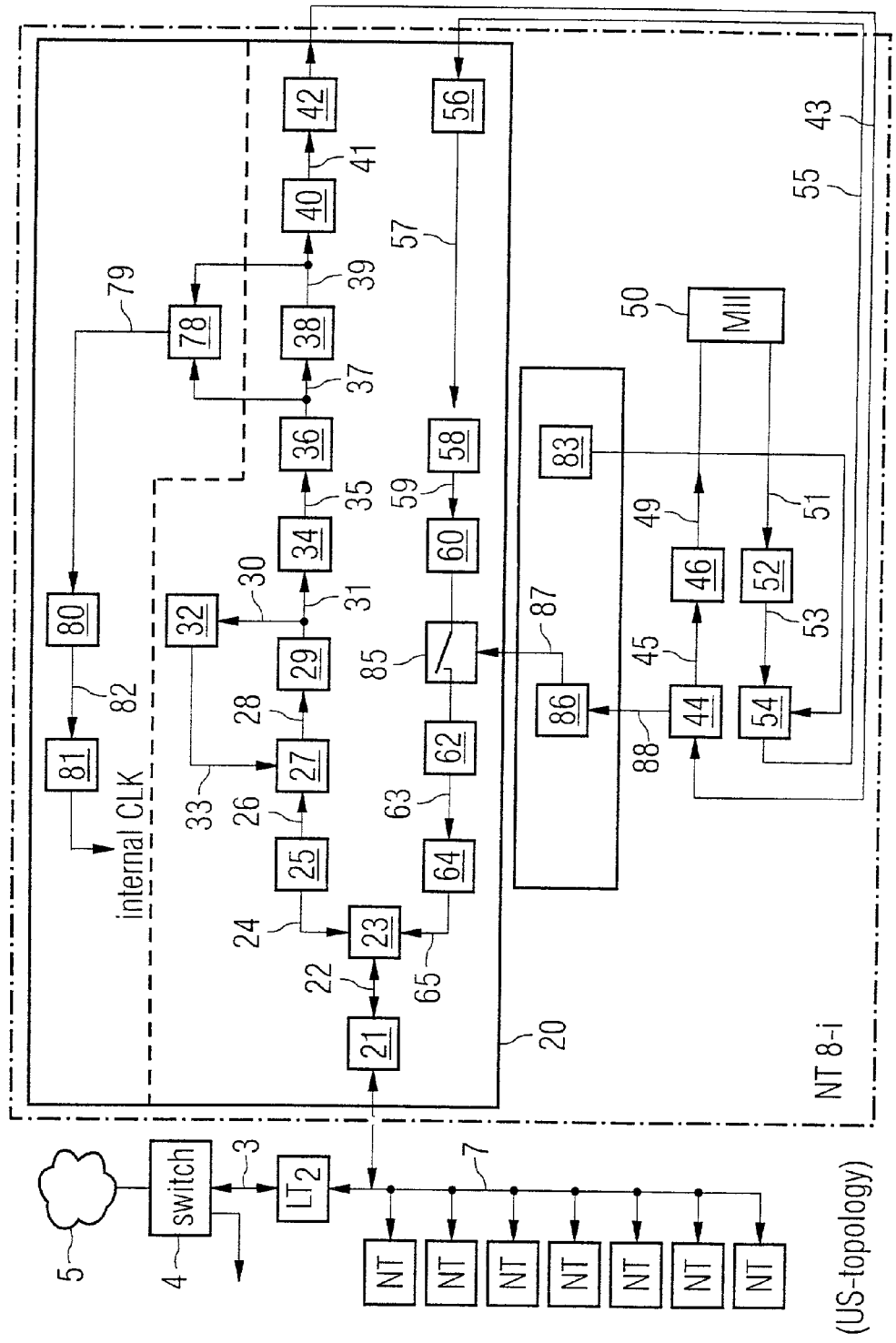

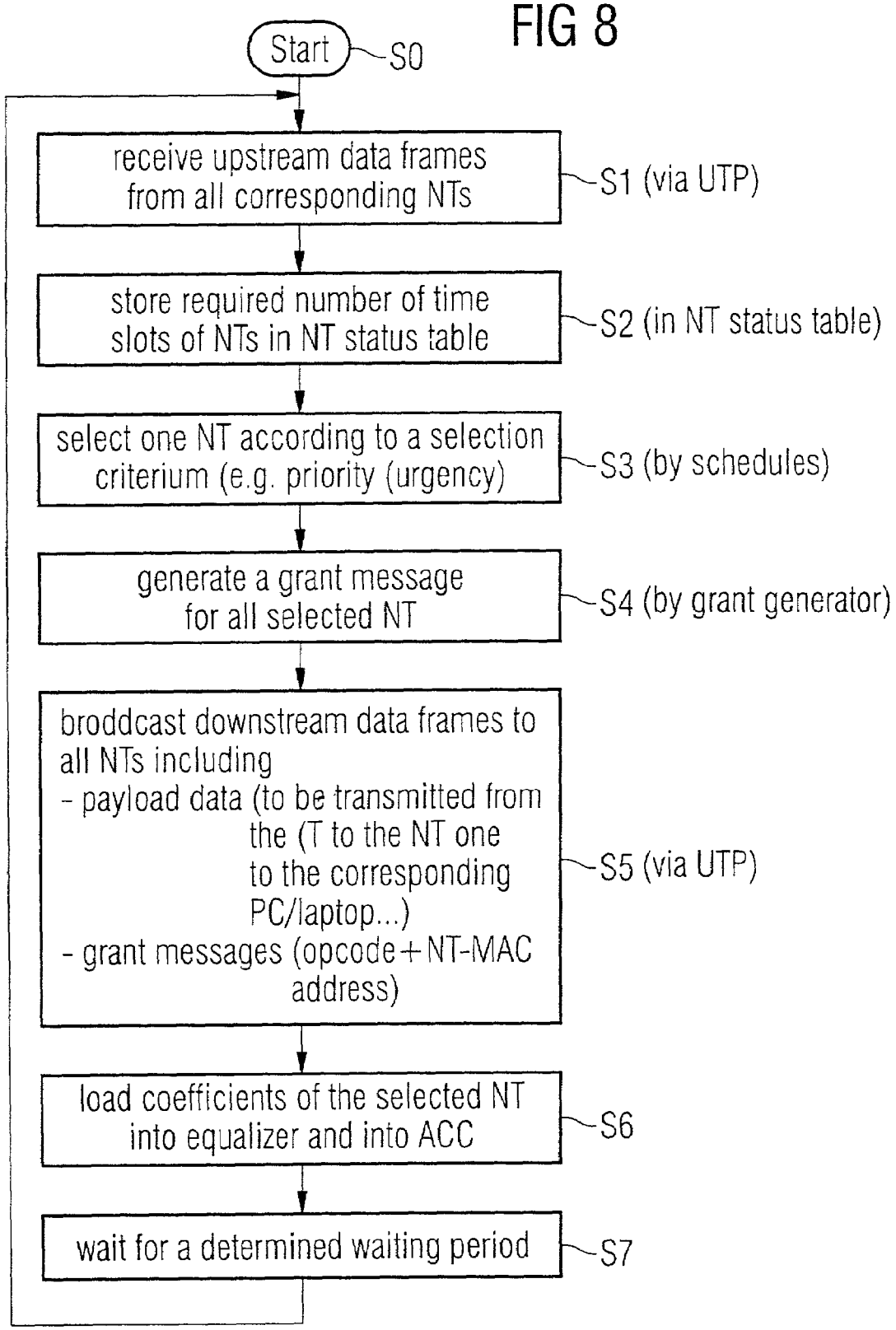

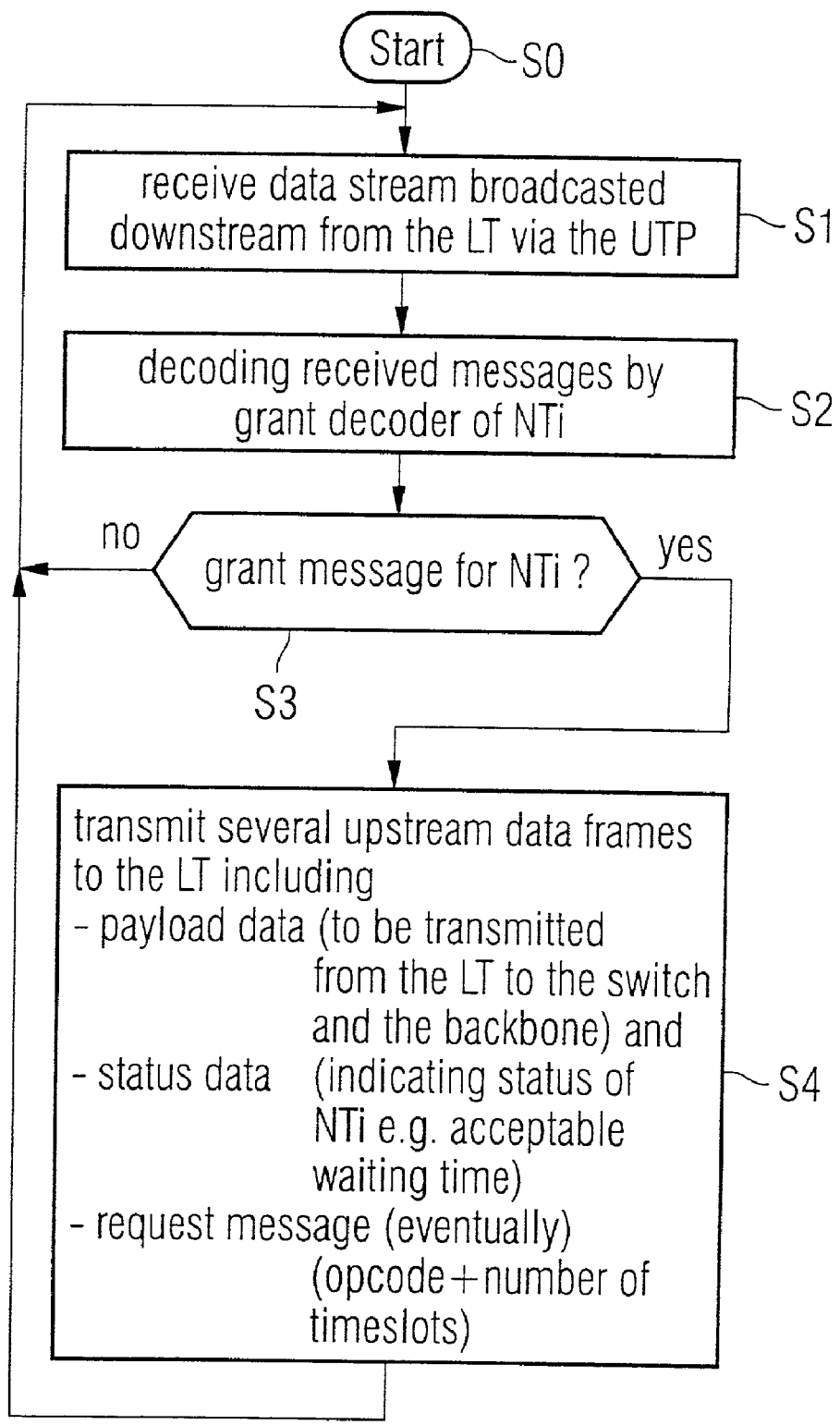

ary ranges Preferably between 4 and 8 MHz.
DATA TRANSMISSION NETWORK

The present invention refers to a data transmission network and a method for data transmission which allow xDSL data transmission and voice data transmission between a backbone network and a network termination device on any data transmission medium such as a copper telephone line.

BACKGROUND

FIG. 1 shows a data transmission network according to the state of the art. An IP backbone is connected via a broad-band data transmission line to a main switch such as an xDSL line termination device. The main switch is connected to several xDSL network termination devices NT over xMII interface. The NT is connected via a UTP telephone line to a local switch or hub which distributes the data packages received from the main switch to different data communication devices such as a personal computer or a laptop or an IP phone via a CAT5 communication line. The switch and the data communication devices form a local area network (LAN), e.g. an Ethernet local area network. The Ethernet local area network according to the state of the art does not allow data exchange between data communication devices and the local switch via an ordinary CAT3 copper telephone line over home telephone topology which requires its own wiring structure besides the telephone lines which are already installed in a building.

SUMMARY

It is a main object of the present invention to provide a data transmission network and a method for data transmission which allow xDSL data exchange and a voice data exchange on any data transmission medium and in particular on an ordinary POTS telephone line. (POTS: Plain Old Telephone Service).

The data transmission network according to the invention has at least one line termination device (LT) connected via a data transmission medium to several network termination devices NT.

Each network termination device (NT) comprises
a request message generator for generating a data transmission request message when a data communication device connected to the network termination device is sending data, and
an xDSL transceiver for transmitting an upstream data frame including the generated request message via the data transmission medium to the line termination device;
said line termination device comprising
a selection unit for selecting network termination devices which have sent a request message depending on stored status information data of the network termination devices,
a grant message generator for generating data transmission grant messages for the selected network termination devices, and
an xDSL transceiver for broadcasting downstream data frames including the generated grant messages via the transmission medium to the network termination devices.

In a preferred embodiment, the data transmission medium is the telephone line, preferably a UTP copper telephone line.

In a preferred embodiment of the data transmission network, the data transmission request message comprises a request message opcode and a number of time slots required for data transmission of the data sent by the data communication device.

In a preferred embodiment of the data transmission network, a data transmission grant message comprises a grant message opcode and an address of the selected network termination device.

In a still further preferred embodiment of the data transmission network according to the present invention, the upstream data frames are sent from the network termination devices to the line termination device via the data transmission medium in an upstream frequency band, and the downstream data frames are sent from the line termination device to the network termination devices via the data transmission medium in a downstream frequency band.

The downstream frequency band ranges preferably between 1 and 3 MHz, and the upstream frequency band ranges Preferably between 4 and 8 MHz.

The line termination device comprises in a preferred embodiment an MII interface for connection to a switch.

Each data frame comprises in a preferred embodiment
a synchronization data field,
the message data field,
a payload data field, and
an error correction data field.

In a preferred embodiment, each network termination device is connected to a passive signal splitter.

The passive signal splitter comprises preferably a low-pass filter for filtering a telephone signal and a high-pass filter for filtering an xDSL data signal.

In a preferred embodiment, the line termination device comprises storing means for storing the information data of the different network termination devices connected to the line termination device.

In a preferred embodiment, the storing means stores the addresses of the network termination devices and the corresponding numbers of required time slots received from the network termination devices in a request message.

In a still further preferred embodiment of the data transmission network according to the present invention, the selection unit of the line termination device reads the status information data stored in the storing means, selects the network termination devices for data transmission according to a programmed selection algorithm and activates the grant message generator for generating grant messages for the selected network termination devices.

In a preferred embodiment, the xDSL transceiver of the line termination device includes an adaptive gain control circuit and an equalizer.

The line termination device comprises preferably
first storing means for storing the automatic gain control coefficients and the network termination devices connected to the line termination device and
second storing means for storing equalizer coefficients for the network termination devices connected to the line termination device.

The automatic gain control coefficients of the network termination device selected by the selecting unit are loaded into the automatic gain control circuit of the xDSL transceiver of the line termination device.

The equalizer coefficients of the network termination device selected by the selecting unit are loaded preferably into the equalizer of the xDSL transceiver of the line termination device.

In a preferred embodiment of the data transmission network according to the present invention, the network termination device comprises a grant decoder for decoding messages within downstream data frames broadcasted by the line termination device.

In a preferred embodiment, the xDSL transceiver of the line termination device and the network termination devices are VDSL transceivers.

In a preferred embodiment, the impedances of the network termination devices connected to the data transmission medium are balanced.

In a preferred embodiment of the data transmission network according to the present invention, at least eight network termination devices are connected via the data transmission medium to the line termination device.

In a preferred embodiment of the data transmission network, several line termination devices are connected to a switch.

In a preferred embodiment of the data transmission network, the switch is connected to an IP backbone.

The invention further provides a method for data transmission comprising the following steps:

generating a data transmission request message by a network termination device when the network termination device receives data from a connected data communication device, transmitting the generated data transmission request message within an upstream data frame via a data transmission medium to a line termination device while getting a grant message, selecting the network termination devices depending on the stored status information data of the network termination devices, generating data transmission grant messages for the selected network termination devices by the line termination device, broadcasting downstream data frames containing the generated grant messages via the data transmission medium to the network termination devices, and transmitting data from the selected network termination device after the grant message has been decoded.

In the following, preferred embodiments of the data transmission network and the data transmission method according to the present invention are described in detail with respect to the enclosed Figures.

BRIEF DESCRIPTION OF THE DRAWINGS

FIG. 5 shows a network termination status table stored within a line termination device;

FIG. 6 shows a block diagram of a network termination device according to the present invention;

FIG. 8 shows a flowchart of the operation within a line termination device;

FIG. 9 shows a flowchart of the operations within the network termination device according to the invention.

DETAILED DESCRIPTION

Figure 1:
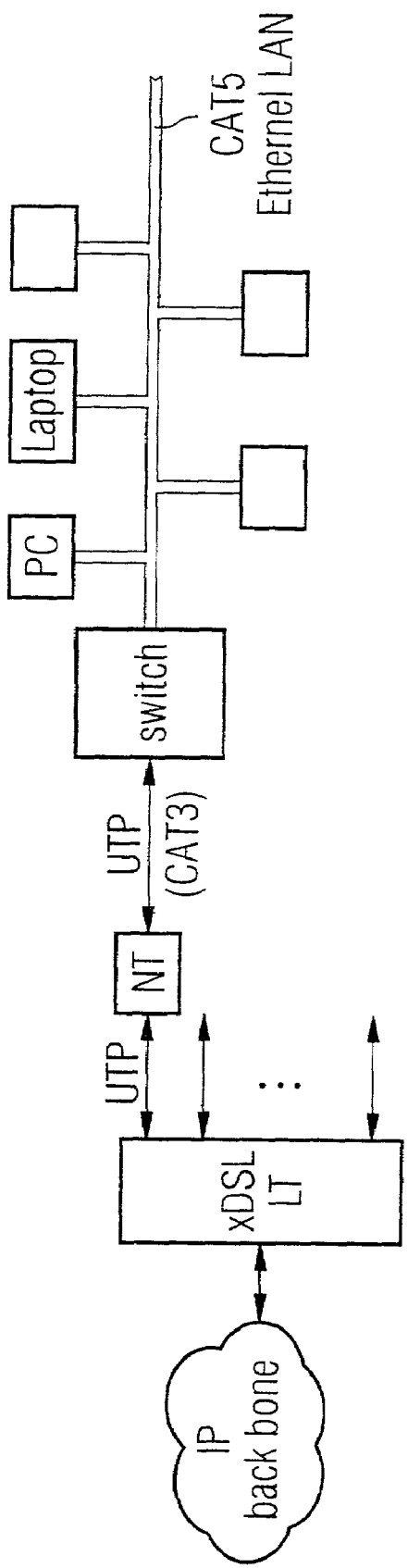
FIG. 1 shows a data transmission network according to the state of the art.
Figure 2:
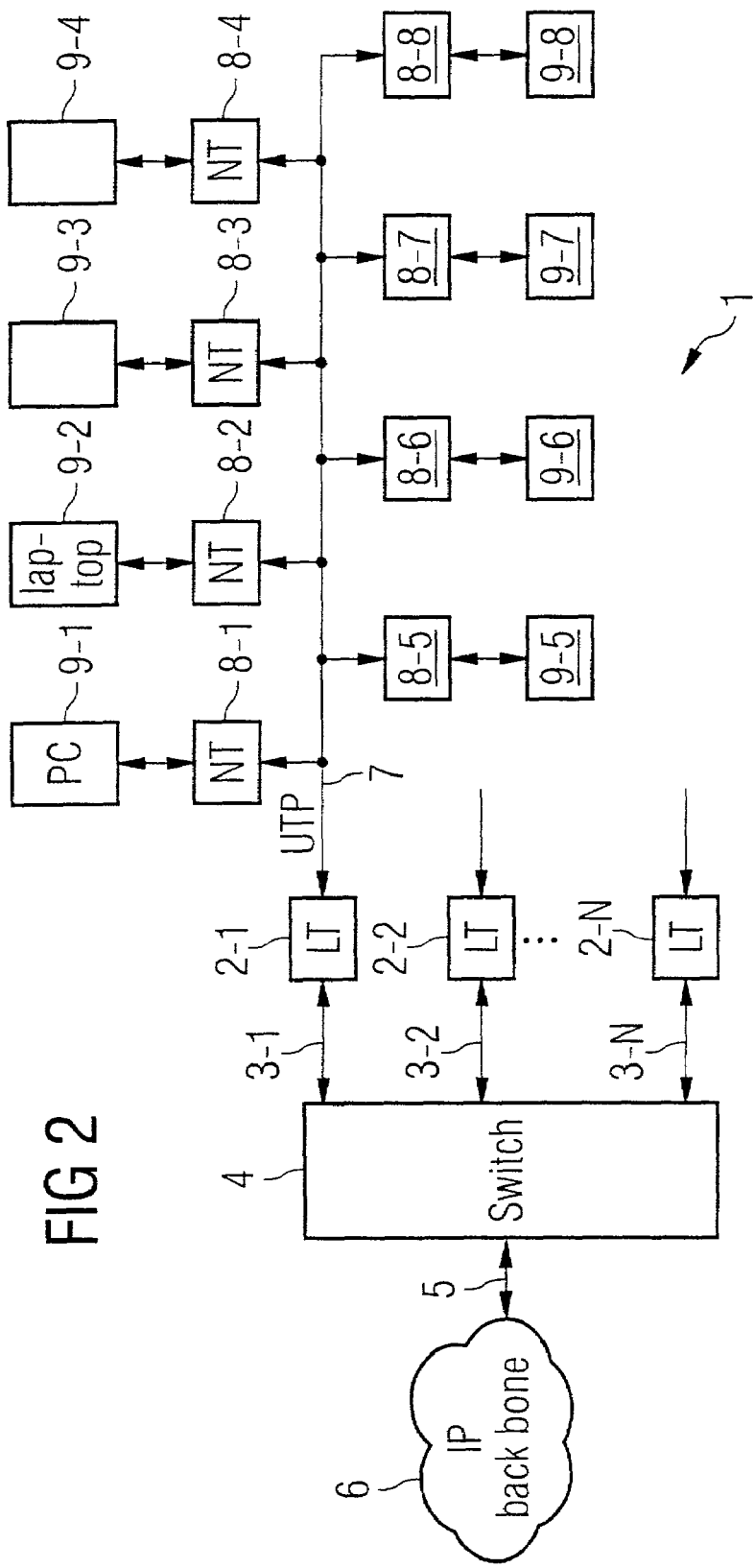
FIG. 2 shows a data transmission network according to the present invention having a topology as found in the United States of America.

FIG. 2 shows a preferred embodiment of a data transmission network 1 according to the present invention. The data transmission network 1 as shown in FIG. 2 has a network topology as found in the United States. The data transmission network 1 comprises several line termination devices 2-1 to 2-N connected via lines 3-1 to 3-N to a switch 4 which is connected via a line 5 to an IP backbone 6. Each line termination device 2 is connected via a data transmission medium 7 through several network termination devices 8-1 to 8-M, wherein in the example shown in FIG. 2, the number M of connected network termination devices is eight. The data transmission medium 7 in the preferred embodiment as shown in FIG. 2 is an unshielded twisted pair of telephone lines (UTP) made of copper. Each network termination device 8-I is connected to a corresponding data communication device 9-I. The data communication devices are personal computers, IP telephones, laptops or television set-top boxes or any other network equipment.

In the data transmission network 1 as shown in FIG. 2, the switch 4 is connected to the IP backbone 6 and exchanges data with a very high data exchange rate. The main switch 4 is e.g. an Ethernet switch to which several line termination devices according to the present invention are connected. The Ethernet switch 4 delivers the Ethernet packets to its destination according to a destination address. The Ethernet packets are broadcasted by the line termination device as downstream data frames via the transmission medium 7 to several network termination devices 8-1 to 8-M in a downstream frequency band.

The downstream frequency band may in a VDSL application range between 1 and 3 MHz. The Ethernet packets are broadcasted with a data transfer rate of e.g. 15/20 MBPS. The network termination device 8-i receives the data packet and transmits it to the corresponding data communication device 9-i. Data coming from data communication device 9-i is sent within an upstream data frame via the data transmission medium 7 to the corresponding line termination device 2.

There are three different possibilities for data transmission paths. In a first data path, the network termination device 8-i sends an upstream Ethernet data frame to the corresponding line termination device 2 which delivers the data frame to the main switch 4. If the upstream frame is addressed to another network termination device 8-j within the same group of network termination devices, the switch 4 sends the received upstream data frame as a downstream data frame via the line termination 2 and the data transmission medium 7 to the addressed destination network termination device 8-j.

If the upstream data frame is addressed to a network termination device 8-j within another group of network termination devices 8, the switch 4 sends the received upstream data frame to the corresponding line termination device 2-j of the destination network termination device 8-j which transmits it via another data transmission telephone line to the addressed network termination device 8-j.

In a third possible data transmission path, the upstream data frame sent by a network termination device 8-j is destined for a remote network termination device and will be delivered from switch 4 via line 5 to the IP backbone 6.

In the data transmission network shown in FIG. 2 according to the US-topology, all network termination devices 8 within one group are connected to the same telephone copper line 7. The network termination devices 8 may be distributed within a range of 100 m. A feeding line between the line termination device 2 and the different network termination devices 8 may be in one building and may have a length between 0.5 and 1 km. The data transmission medium 7 in the form of the unshielded twisted pair telephone line made of copper is already wired within the building and is used by the present invention also for xDSL data transmission. Accordingly the data communication devices 9-i within in the building may form a local area network (LAN) without the need to provide a separate Ethernet cable structure.

Figure 3:
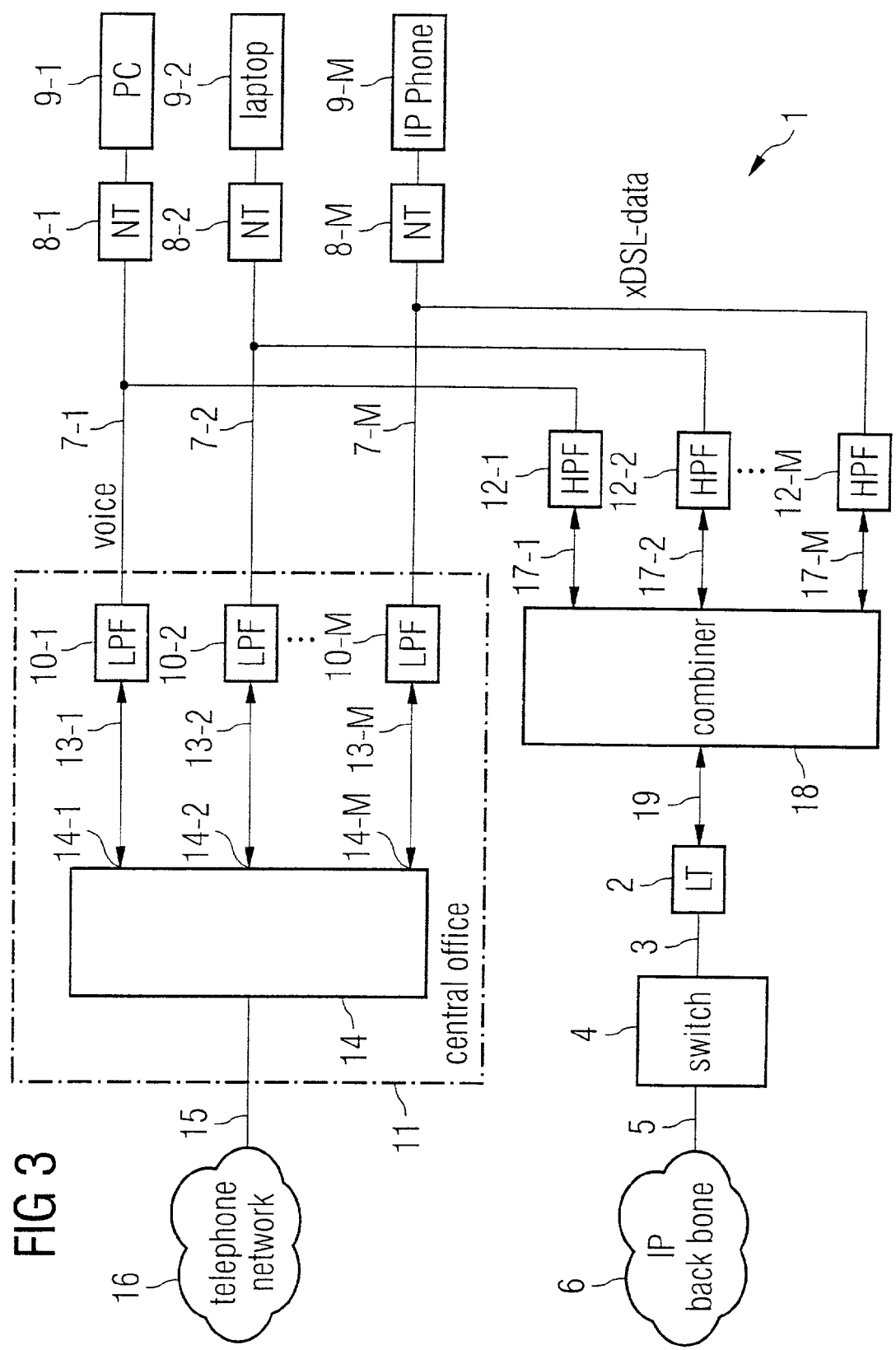
FIG. 3 shows a data transmission network according to the present invention having a topology as found in Europe and in Asia.

FIG. 3 shows a data transmission network 1 having the topology as can be found in Europe and Asia. Several data communication devices 9-i are connected by means of a network termination device 8-i and a data transmission medium 7-i such as an unshielded twisted telephone line (UTP) to a corresponding low-pass filter 10-i within a central office 11 and to a corresponding high-pass filter 12-i. The low-pass filters 10 may have a cut off frequency between 8 kHz and 0.1 MHz for filtering voice data, and the high-pass filters 12 may have a cut off frequency between 0.1 MHz and 0.7 MHz for filtering xDSL data signals. Each low-pass filter 10-i within the central office 11 is connected via a line 13-i to a telephone switch entry 14-i of a telephone switch 14. The telephone switch 14 is connected via a line 15 to an ordinary POTS telephone network 16.

The high-pass filters 12 are connected via lines 17 to a combiner 18 which adds up the received high-pass filtered signals. The combiner 18 is connected via line 19 to a line termination device 2. The line termination device 2 is connected via line 3 to a main switch 4 which is connected via line 5 to an IP backbone 6. In the data transmission network having the topology as shown in FIG. 3, a multiport POTS/xDSL splitter comprising the plurality of low-pass filters 10 and high-pass filters 12 is provided. The splitter filters the telephone signal on one side and filters the xDSL signal on the other side.

Figure 4:
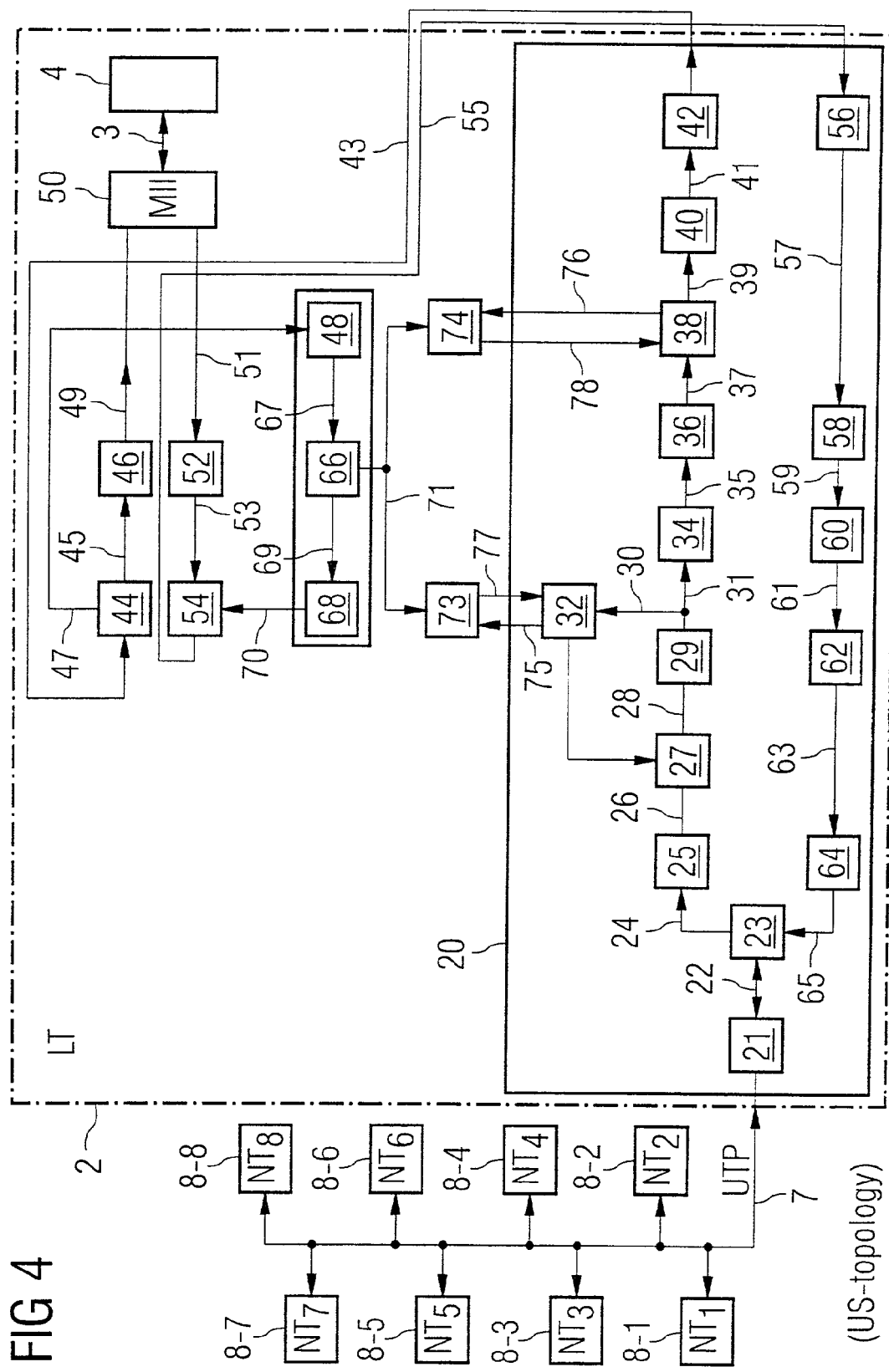
FIG. 4 shows a block diagram of a line termination device according to the present invention.

FIG. 4 shows a block diagram of a line termination device 2 according to a preferred embodiment of the present invention.

The line termination device 2 comprises an xDSL transceiver 20 for broadcasting downstream data frames to several network termination devices 8-I via the data transmission medium 7 and for receiving upstream data frames from the network termination devices 8-I via the data transmission medium 7. The data medium 7 is e.g. an unshielded twisted pair telephone line UTP made of copper. The xDSL transceiver 20 within the line termination device 2 comprises a line driver 21 for driving the received signals and for driving signals to be transmitted. The line driver 21 is connected via a line 22 to a hybrid circuit 23 which applies the received data signals via a line 24 to an analog receiving filter 25 which is connected on the output side via a line 26 to an amplifier unit 27 for amplifying the received and filtered data signals. The amplified received signal is supplied via line 28 to an analog/digital converter 29 which converts the received analog signal to a digital signal. The received digital signal is supplied via lines 30, 31 to an automatic gain control circuit 32 controlling the amplifier 27 via a control line 33 and to a digital QAM demodulator 34. The QAM demodulator is connected on its output side via a line 35 to a digital receiving filter 36 for suppressing noise. The digital filter 36 is connected via line 37 to an equalizer 38 for compensating determining the received data symbols. The slicer 40 is connected via line 41 to a QAM decoder 42 which generates from the detected data symbols the corresponding data bits to be packed in a data frame. The QAM decoder 42 is connected via line 43 to a TC deframer 44 which is connected via line 45 to a deframer 46, e.g. an Ethernet deframer. The TC deframer 44 distracts messages from the received upstream data frames and supplies them via a line 47 to an NT status memory 48. The deframer 46 is connected via line 49 to an MII interface 50 for connecting the line termination device 2 via a line 3 to a switch 4.

The MII interface 50 is connected via a line 51 to a framer 52, e.g. an Ethernet framer. The Ethernet framer 52 is connected via line 53 to a TC (TC: Transparence Convergence) framer 54. The TC framer 54 is connected via line 55 to a QAM encoder 56 within the xDSL transceiver 20. The QAM encoder 56 is connected via line 57 to a digital transmitting filter 58. The filtered digital signal is supplied via line 59 to a digital modulator 60 which is connected on its output side via line 61 to a digital/analog converter 62. The modulated digital signal is converted by the digital analog converter 62 to an analog signal which is supplied via line 63 to an analog filter 64. The filtered analog signal is supplied via line 65 through the hybrid circuit 23 and broadcasted via the line driver 21 and the data transmission medium 7 to the network termination devices 8-I.

The line termination device 2 comprises a selection unit 66 which is connected via lines 67 to the NT status memory 48. The selection unit 66 selects the network termination devices which have sent a request message within an upstream data frame depending on the status information data stored within the status storage means 48.

The line termination device 2 further comprises a grant message generator 68 connected to the selection unit 66 via line 69. The grant generator 68 is connected via control line 70 to the TC framer unit 54. The selection unit 66 selects according to the information data stored within the storage means 48 a network termination device 8-j connected to the line termination device 2 and activates the grant message generator 68 for generating a data transmission grant message for the selected network termination device 8-i.

The selection unit 66 further controls via control lines 71, 72 an AGC random access memory 73 and an equalizer coefficient random access memory 74. In the AGC random access memory 73, the automatic gain control coefficients for the different network termination devices 8-i of one group are stored. In the equalizer coefficient random access memory 74, the equalizer coefficients for the different network termination devices 8-i within one group connected to the line termination device are stored. The automatic gain control random access memory 73 stores the AGC coefficients via line 75 from the automatic gain control circuit 32 within the xDSL transceiver 20. The equalizer coefficient random access memory 74 stores the equalizer coefficients of the different network termination devices from the equalizer 38 via line 76. The AGC coefficients of the selected network termination device are loaded into the automatic gain control circuit 32 via a line 77 in response to a control signal supplied by the selection unit 66 via control line 71. The equalizer coefficients are loaded into the equalizer 38 via a line 78 in response to a control signal of the selection unit 66 delivered via control line 72.

The selection unit 66 reads the status information data stored within the NT status storing means 48 and selects the network termination devices 8-i for data transmission according to a programmed selection algorithm and activates the grant message generator 68 for generating grant messages for the selected network termination devices 8-i. The selection of the network termination devices may be performed by any selection scheme such as a priority scheme. In an alternative embodiment, all network termination devices 8-i may have the same priority.

FIG. 5 shows an example for a network termination device status table stored within the storing means 48. Each network termination device connected to the line termination device 2 has a unique network termination device address. As status information, the status table may contain the number of time slots required by the different network termination devices 8-i for data transmission. This number is received by the line termination device 2 in an upstream data frame as a request message. Any kind of further data information of the different network termination devices 8-I may be stored in the status table which are necessary for the selection algorithm.

FIG. 6 shows a block diagram of a preferred embodiment of a network termination device 8 according to the present invention.

The network termination device 8 comprises an xDSL transceiver 20 having a similar structure as the xDSL transceiver 20 in the line termination device. Additionally the network termination device 8 comprises a timing circuit 78 for tracking the timing of the clock signal of the line termination device 2. The timing circuit 78 is provided for synchronizing on the line termination device master clock. The timing circuit 78 is connected via line 79 through a voltage controller circuit 80 controlling a voltage controlled oscillator 81 via control line 82, the voltage controlled oscillator 81 generating an internal clock signal for the network termination device.

The network termination device 8 further comprises a network termination device status generator 83 generating any kind of status information data describing the status of the network termination device. The NT status generator 83 generates messages which contain information about the network termination device, and In particular how many time slots for data transmission are required by the network termination device. The generated request message is transmitted via a line 84 to the TC framer 54 and put into a message field within an upstream data frame to be sent to the line termination device by the xDSL transceiver 20.

In the transmitting path of the xDSL transceiver 20 of the network termination device 8 there is provided an additional switch 85 controlled by a grant decoder 86 via a control line 87. When sending data information, switch 85 is closed. The request message generator 83 generates a data transmission request message when the data communication device 9 connected to the network termination device 8 contains a buffer memory for buffering data sent from the data communication device 9 when a request for data communication is not granted by the line termination device 2 immediately.

The grant message decoder 86 is connected via line 88 to the TC deframer 44 and decodes the messages within a message field of the received downstream data frames broadcasted by the line termination device 2 via the data communication medium 7. In case that the grant decoder 86 decodes a grant message addressed to the specific network termination device 8-i it sends a control signal via the control line 87+0 to the switch 85 and the buffered data coming from the corresponding data communication device 9-i connected to the network termination device 8-i are transmitted to the line termination device 2 via the data communication medium 7 which is preferably an unshielded twisted pair telephone line.

The TC framer 54 within the line termination device and the network termination device may also contain a Reed-Solomon-correction unit, a scrambler and an interleaver.

Figure 7A:
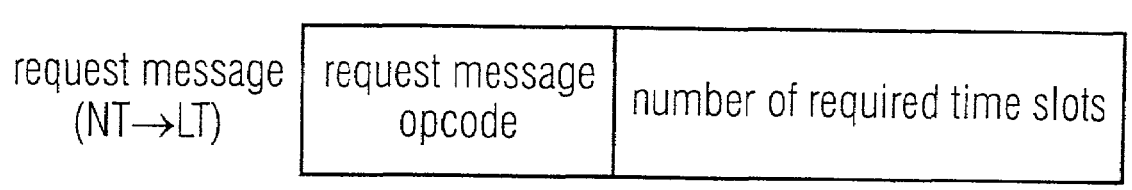
FIGS. 7a, 7b show a request message and a grant message in principle.

FIG. 7a shows a request message transmitted from a network termination device 8 upstream to a line termination device 2 in principle. The request message which is put into a message field of an upstream data frame contains a request message opcode which may be recognized by the TC deframer unit 44 within the line termination device 2. The request message further includes a number of time slots which are required for data transmission by the network termination device 8 which sends the request message.

Figure 7B:

FIG. 7b shows a grant message in principle. The grant message contains a grant message opcode which may be recognized by a grant message decoder 86 within a network termination device 8. The grant message further contains the MAC address of the destination network termination device 8.

FIG. 8 shows a flowchart for describing the operation within a line termination device 2 in principle.

After a start step S0, the line termination device 2 receives in a step S1 upstream data frames from all corresponding network termination devices 8-i connected to the line termination device 2 via the data transmission medium 7. The network termination devices 8-i are scheduled by the line termination device 2.

If the received upstream data frames contain data transmission request messages, the TC deframer 44 of the line termination device 2 stores the number of time slots requested by the network termination device into the NT status table of memory 48 in a step S2.

In step S3, the selection unit 66 selects at least one network termination device 8-i according to programmed selection criteria according to a given priority or to urgency of data transmission.

In a further step S4, the grant message generator 68 is activated by the selection unit 66 and generates a grant message addressed to the selected network termination device 8-i.

In a step S5, the line termination device 2 broadcasts downstream data frames to all network termination devices 8-i connected to the line termination device 2 via the telephone line 7. The broadcasted downstream data frames include payload data to be transmitted from the line termination device 2 to the network termination devices 8 and from there to the corresponding data communication devices 9 such as computers, laptops or IP phones. Further data frames include the generated grant messages, i.e. the grant message opcode and the MAC-addresses of the selected network termination devices 8.

In a further step S6, the AGC coefficients stored in the memory 73 and the equalizer coefficients stored in the memory 74 are loaded into the automatic gain control circuit 32 and into the equalizer 38 of the xDSL transceiver 20 within the line termination device 2.

In a further step S7, the line termination device 2 waits for determined response time for the response from the network termination devices 8.

FIG. 9 shows the further flowchart for describing the operation within the network termination device 8-I according to the present invention. After a start step S0, the network termination device 8 receives a data stream broadcasted from the line termination device 2 via the data transmission medium 7 in a step S1. The messages within the message fields of the received downstream data frames are decoded by the decoder 86 within the network termination device 8 in a step S2.

In a further step S3, it is decided whether the received message is a grant message for the specific network termination device 8 or not. In case that the network termination device did not receive a grant message, it further monitors the data frames broadcasted by the corresponding line termination device 2.

In case that the network termination device 8 has received a grant message from the line termination device 2, it transmits in a step S4 several upstream data frames to the line termination device 2 via the data transmission medium 7. The number of the transmitted upstream data frames depends on the number of time slots allocated by the line termination device 2 for data transmission. The upstream data streams include payload data to be transmitted from the line termination device 2 via switch 4 to further line termination devices 2 or to the backbone 5 or to other network termination devices 8 within the same group. Further, the upstream data frames include status data indicating the actual status of the network termination device 8-i, e.g. acceptable waiting time for receiving grant messages. Further, the upstream data frame sent by the network termination device 8 may contain further messages, such as a further request message containing a request message opcode and number of time slots required for further data transmission.

The line termination device 2 comprises an xDSL transceiver having a MAC functionality and acts as the master of the point to multi-point data link. The line termination device 2 schedules each network termination device 8 on a TDD basis. In a European or Asian network topology, a passive signal splitter is provided in order to combine the xDSL signal of different users on one copper line.

The network termination device 8 comprises an xDSL transceiver transmitting data according to the request received from the master, i.e. a line termination device 2.

On the downstream frequency band, a sustained signal is transmitted permanently from the line termination device 2, i.e. the line termination device 2 broadcasts all the time downstream data frames. This has the advantage that all network termination devices 8 keep being synchronized to the downstream signal. Each network termination device 8 transmits its upstream signal when getting a grant on the message channel. The transmission is performed for a granted period of time.

With the invention it is possible using a well-proven xDSL-QAM transceiver for the physical layer over the target infrastructure which is e.g. a telephone line (CAT3). Using a TDM media access control on the upstream side and broadcasting of data frames on the downstream has the advantage that the xDSL transceiver has a reduced synchronization time on the upstream. Using an xDSL transceiver makes the system according to the present invention compliant with other xDSL systems.

The data transmission is carried on a signal copper line, upstream and downstream, wherein the copper line may be shared by at least eight users. Since the line termination device 2 works as a master, no collision base MAC is required and all network communication devices are fully synchronized. The data transmission network may be implemented either in a US-topology or European/Asian topology. The data transmission network according to the present invention takes advantage of the current asymmetric application demand and is compatible with 10BaseS. Possible applications are fast Internet, game on demand, netgames, centric services, MPEG-4 VOD.

In a preferred embodiment, the messages are protected with CRC. In case that an error is detected in one message, the message may be discarded. Some important messages may be transmitted up to three times in order to ensure their reception. The grant message has to have a minimal response time.

The line termination device 2 keeps the last equalizer coefficients and ACG coefficients of each network termination device 8 connected to the line termination device 2. The line termination device 2 reloads the coefficients to its xDSL transceiver while awaiting the relevant NT signal. In order to avoid reflections on the data transmission medium, the impedances of the different network termination devices 8 are balanced.

The invention claimed is:

1. Data transmission network having
    at least one line termination device connected via a telephone line wired within a building to several network termination devices, wherein each network termination device is connected to a corresponding data communication device to form a local area network (LAN) comprising:
    a request message generator for generating a data transmission request message when the data communication device connected to the network termination device is sending data, wherein a data transmission request message comprises a request for data transmission of the data sent by the data transmission device, and
    an xDSL transceiver for transmitting an upstream data frame including the generated request message via the telephone line to the line termination device,
    the line termination device comprising:
    a selection unit for selecting network termination devices which have sent a data transmission request message depending on status information data of the network termination devices stored in storing devices of the line termination devices, wherein the status information includes addresses of the network termination devices and corresponding numbers of the required time slots received from the network termination devices in data transmission request messages,
    a grant message generator for generating data transmission grant messages for the selected network termination devices, wherein each data transmission grant message comprises a grant message opcode and an address of the selected network termination device, and
    an xDSL transceiver for broadcasting downstream data frames including the generated grant messages via the telephone line to the network termination devices.

2. Data transmission network according to claim 1, wherein
    the upstream data frames are sent from the network termination device to the line termination device via the telephone line in an upstream frequency band, and
    the downstream data frames are sent from the line termination device to the network termination device via the telephone line in a downstream frequency band.

3. Data transmission network according to claim 2, wherein
    the downstream frequency band ranges between 1 and 3 MHz and
    the upstream frequency band ranges between 4 and 8 MHz.

4. Data transmission network according to claim 1, wherein each line termination device comprises an MII interface for the connection to a switch.

5. Data transmission network according to claim 1, wherein each data frame comprises:
    a synchronization data field,
    a message data field,
    a payload data field, and
    an error correction data field.

6. Data transmission network according to claim 1, wherein each network termination device is connected to a passive signal splitter.

7. Data transmission network according to claim 6, wherein the passive signal splitter comprises
  a low-pass filter for filtering a telephone signal, and
  a high-pass filter for filtering an xDSL data signal.

8. Data transmission network according to claim 1, wherein the selection unit
  reads the status information data stored in the storing means,
  selects the network termination devices for data transmission according to a programmed selection algorithm, and
  activates the grant message generator for generating grant messages for the selected network termination devices.

9. Data transmission network according to claim 1, wherein the xDSL transceiver of the line termination device includes an adaptive automatic gain control circuit and an equalizer.

10. Data transmission network according to claim 1, wherein the line termination device comprises
  a first storing means for storing AGC coefficients for the network termination devices connected to the line termination device, and
  a second storing means for storing equalizer coefficients for the network termination devices connected to the line termination device.

11. Data transmission network according to claim 10, wherein the AGC coefficients of the selected network termination device selected by the selecting unit are loaded into the AGC circuit of the xDSL transceiver of the line termination device.

12. Data transmission network according to claim 10, wherein the equalizer coefficients of the selected network termination device selected by the selecting unit are loaded into the equalizer of the xDSL transceiver of the line termination device.

13. Data transmission network according to claim 1, wherein the network termination device comprises a grant decoder for decoding messages within downstream data frames broadcasted by the line termination device.

14. Data transmission network according to claim 1, wherein the xDSL transceivers are VDSL transceivers.

15. Data transmission network according to claim 1, wherein the impedances of the network termination devices connected to the data transmission medium are balanced.

16. Data transmission network according to claim 1, wherein eight network termination devices are connected via the data transmission medium to the line termination device.

17. Data transmission network according to claim 1, wherein several line termination devices are connected to a switch.

18. Data transmission network according to claim 17, wherein the switch is connected to an IP backbone.

19. Method for data transmission comprising:
  generating a data transmission request message by a network termination device when the network termination device receives data from a connected data communication device, wherein a data transmission request message comprises a request message opcode and a number of time slots required for data transmission of the data sent by the data communication device;
  transmitting the generated data transmission request message within an upstream data frame via a telephone line wired within a building to a line termination device;
  selecting the network termination devices depending on stored status information data of the network termination devices, wherein the status data includes addresses of the network termination devices and corresponding numbers of the required time slots received from the network termination device in data transmission request messages;
  generating data transmission grant messages for the selected network termination devices by the line termination device, wherein each data transmission grant message comprises a grant message opcode and an address of the selected network termination device;
  broadcasting downstream data frames containing the generated grant messages via the telephone line to the connected network termination devices; and
  transmitting data from the selected network termination device after the grant message has been decoded.

* * * * *